(12) United States Patent
Kurematsu et al.

(10) Patent No.: US 6,894,842 B2
(45) Date of Patent: May 17, 2005

(54) PROJECTION OPTICAL SYSTEM, IMAGE DISPLAY APPARATUS, AND IMAGE DISPLAY SYSTEM

(75) Inventors: Katsumi Kurematsu, Kanagawa (JP); Toshihiro Sunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/196,304

(22) Filed: Jul. 16, 2002

(65) Prior Publication Data

US 2003/0067691 A1 Apr. 10, 2003

(30) Foreign Application Priority Data

Jul. 18, 2001 (JP) ........................................ 2001-218057

(51) Int. Cl.[7] ............................ G02B 3/00; G02B 27/14
(52) U.S. Cl. ...................... 359/649; 359/630; 359/728
(58) Field of Search ............................... 359/630, 631, 359/633, 554, 556, 649, 726–736, 850–864

(56) References Cited

U.S. PATENT DOCUMENTS

| | | | | |
|---|---|---|---|---|
| 4,864,390 A | * | 9/1989 | McKechnie et al. | 348/751 |
| 5,825,560 A | | 10/1998 | Ogura et al. | 359/822 |
| 5,847,887 A | | 12/1998 | Ogura et al. | 359/822 |
| 5,999,311 A | | 12/1999 | Nanba et al. | 359/365 |
| 6,021,004 A | | 2/2000 | Sekita et al. | 359/676 |
| 6,046,857 A | * | 4/2000 | Morishima | 359/728 |
| 6,166,866 A | | 12/2000 | Kimura et al. | 359/729 |
| 6,270,224 B1 | | 8/2001 | Sunaga et al. | 359/857 |
| 6,292,309 B1 | | 9/2001 | Sekita et al. | 359/729 |
| 6,313,942 B1 | | 11/2001 | Nanba et al. | 359/365 |
| 6,366,411 B1 | | 4/2002 | Kimura et al. | 359/729 |
| 6,409,352 B1 | | 6/2002 | Sunaga | 359/859 |
| 6,459,530 B2 | | 10/2002 | Nanba et al. | 359/365 |
| 6,522,475 B2 | | 2/2003 | Akiyama et al. | 359/676 |
| 6,639,729 B2 | | 10/2003 | Tanaka et al. | 359/676 |
| 2001/0009478 A1 | * | 7/2001 | Yamazaki et al. | 359/630 |
| 2002/0008853 A1 | * | 1/2002 | Sunaga | 353/69 |
| 2002/0018289 A1 | * | 2/2002 | Nanba et al. | 359/365 |
| 2002/0105734 A1 | * | 8/2002 | Kimura et al. | 359/729 |
| 2003/0007255 A1 | * | 1/2003 | Akiyama et al. | 359/676 |
| 2003/0137742 A1 | * | 7/2003 | Akiyama et al. | 359/627 |

FOREIGN PATENT DOCUMENTS

| | | |
|---|---|---|
| JP | H04-097671 A | 3/1992 |
| JP | Hei 5-37948 | 2/1993 |
| JP | H09-074532 A | 3/1997 |
| JP | H11-109243 A | 4/1999 |
| JP | 2001-128038 A | 5/2001 |

OTHER PUBLICATIONS

English Abstract of JPH11–109243 (A).
English Abstract of JP2001–128038 (A).
English Abstract, Applicant's comments, partial translation into English and drawings of JPH04–097671 (A).

* cited by examiner

Primary Examiner—Huang Xuan Dang
Assistant Examiner—M. Hasan
(74) Attorney, Agent, or Firm—Morgan & Finnegan, L.L.P.

(57) ABSTRACT

The invention discloses a projection optical system for projecting an original image onto a projection surface. The projection optical system comprises a plurality of aspherical curved mirrors, which reflects image light from the original image in sequence and then forms an image on the projection surface. The projection optical system forms a projected image on the projection surface at an aspect ratio different from that of the original image by a combination of reflective actions of the image light on the aspherical surfaces of the plurality of aspherical curved mirrors. Even in a projection optical system having a wide angle of view and a short distance of projection, it is possible to implement a projection optical system that is capable of suppressing distortion and performing an optical aspect conversion.

23 Claims, 7 Drawing Sheets

PROJECTION OPTICAL SYSTEM, IMAGE DISPLAY APPARATUS, AND IMAGE DISPLAY SYSTEM

BACKGROUND OF THE INVENTION

1. Field of the Invention

The present invention relates to a projection optical system which is employed onto an image display apparatus such as a projector.

2. Description of Related Art

A projection optical system for performing a so-called optical aspect conversion has been suggested, for example, in Japanese Laid-Open No. Hei-5-37948. This projection optical system is adapted to project an image from an image display device such as a liquid crystal display panel in a manner such that the image display device and an enlargedly projected image onto a projection surface have different aspect ratios.

This projection optical system is provided with an anamorphotic lens to its lens optical system to change its magnifying capacity in only the horizontal direction with respect to the vertical direction.

A projection optical system, such as a front projector, having a relatively long projection distance and a narrow angle of view can provide a relatively satisfactory image-forming performance even when being provided with an anamorphotic lens as in the projection optical system suggested by the aforementioned publication. However, a projection optical system, such as a rear projection display apparatus, having a short projection distance and a wide angle of view causes an aberration such as distortion to grow to a non-negligible extent, thereby making impractical the configuration of the projection optical system suggested by the aforementioned publication.

SUMMARY OF THE INVENTION

It is therefore the object of the present invention to provide a projection optical system, such as a rear projection display apparatus, having a wide angle of view and a short distance of projection, which is capable of suppressing distortion and performing an optical aspect conversion, and an image display apparatus and an image display system employing this projection optical system.

To achieve the aforementioned object, the projection optical system according to the present invention which projects an original image onto a projection surface comprises the following components.

That is, the aforementioned projection optical system comprises a plurality of aspherical curved mirrors, each having an aspherical surface, which reflects image light from the original image in sequence and then forms the image on the projection surface. The projection optical system forms a projected image on the projection surface at an aspect ratio different from that of the original image by a combination of reflective actions of the image light on the aspherical surfaces of the plurality of aspherical curved mirrors.

In this arrangement, it is possible to provide at least six aspherical curved mirrors as the plurality of aspherical curved mirrors. Furthermore, of the six aspherical curved mirrors, at least two aspherical curved mirrors having a positive refractive power may be employed together with two aspherical curved mirrors having a negative refractive power.

Typically, to reduce an image distortion or to meet Petzval's condition, it is necessary to balance the positive and negative curvature of reflective surfaces (i.e., convex and concave surfaces). However, it is preferable to provide less difference in curvature among the reflective surfaces in terms of aberration reduction. Therefore, for six or more curved mirrors, it is preferable to set the ratio of the number of concave surfaces to that of convex surfaces at 2:4 (1:2) to 4:2 (2:1) such as 2:4, 3:3, or 4:2.

On the other hand, among the plurality of aspherical curved mirrors, both the mirror closest to the original image and the mirror closest to the projection surface may be a concave surface.

This arrangement causes a light flux of the image light radiated enlargedly (diffusively) from the original image to be made tele-centric due to the condensing action of the concave mirror closest to the original image. This allows the subsequent reflective surfaces to be reduced in size and the image light to then keep traveling while being repeatedly reflected. Furthermore, in a case where a light flux is widened to provide a necessary angle of projection onto the projection surface utilizing light condensing action by means of the concave surface of the concave mirror closest to the projection surface, a mirror having less area can be used, compared with a case in which a convex surface is employed.

Furthermore, with an aspect ratio defined by dividing the vertical length of an image by its horizontal width, the projection optical system may be constituted so as to project an original image in a manner such that the aspect ratio of a projected image onto a projection surface is 1.3 times or greater, or 0.8 times or less than that of the original image.

In order to achieve the aforementioned object, an image display apparatus according to the present invention includes the following components. That is, the image display apparatus comprises an image display device, which displays an original image, a light source, which illuminates the image display device, and a projection optical system, according to the aforementioned invention which projects image light radiated from the image display device, onto a projection surface.

The projection optical system of the image display apparatus makes it possible to project image light radiated from the image display device onto the projection surface in a diagonal direction or onto the backside surface of the projection surface.

Furthermore, it is possible to configure an image display system comprising: the image display apparatus according to the aforementioned invention and a projected member configuring the projection surface. For example, a projected member, wherein at least two eccentric Fresnel lenses having identical construction are stacked, may be employed. Alternatively, a projected member, wherein two eccentric Fresnel lenses having identical construction are disposed in a stacked state, and one additional lenticular lens is disposed, may be employed.

Furthermore, it is also possible to configure an image display system comprising: the image display apparatus according to the aforementioned invention and an image information supply apparatus, such as a personal computer, a video player, or a DVD player, which supplies image information to be displayed on the image display device to the image display apparatus.

A detailed configuration of the projection optical system, image display apparatus, and image display system of the invention, the above and other objects and features of the invention will be apparent from the embodiments, described below.

DETAILED DESCRIPTION OF THE PREFERRED EMBODIMENTS

Hereinafter, preferred embodiment of the invention will be described in detail with reference to the drawings.

The embodiments to be described below can provide an optical aspect conversion function as well as a desired image forming performance in a projection optical system. For example, employing the projection optical system in a rear projection display apparatus will make it possible that a high definition (HD) image or the like is enlargedly projected onto a horizontally elongated screen by using a 3:4 image display device. Accordingly, it is possible to implement a thin and large screen type rear projection display apparatus that employs a diagonal incidence projection system of an optical aspect conversion type so as to enable the projection of high quality and high definition images.

Figure 1:
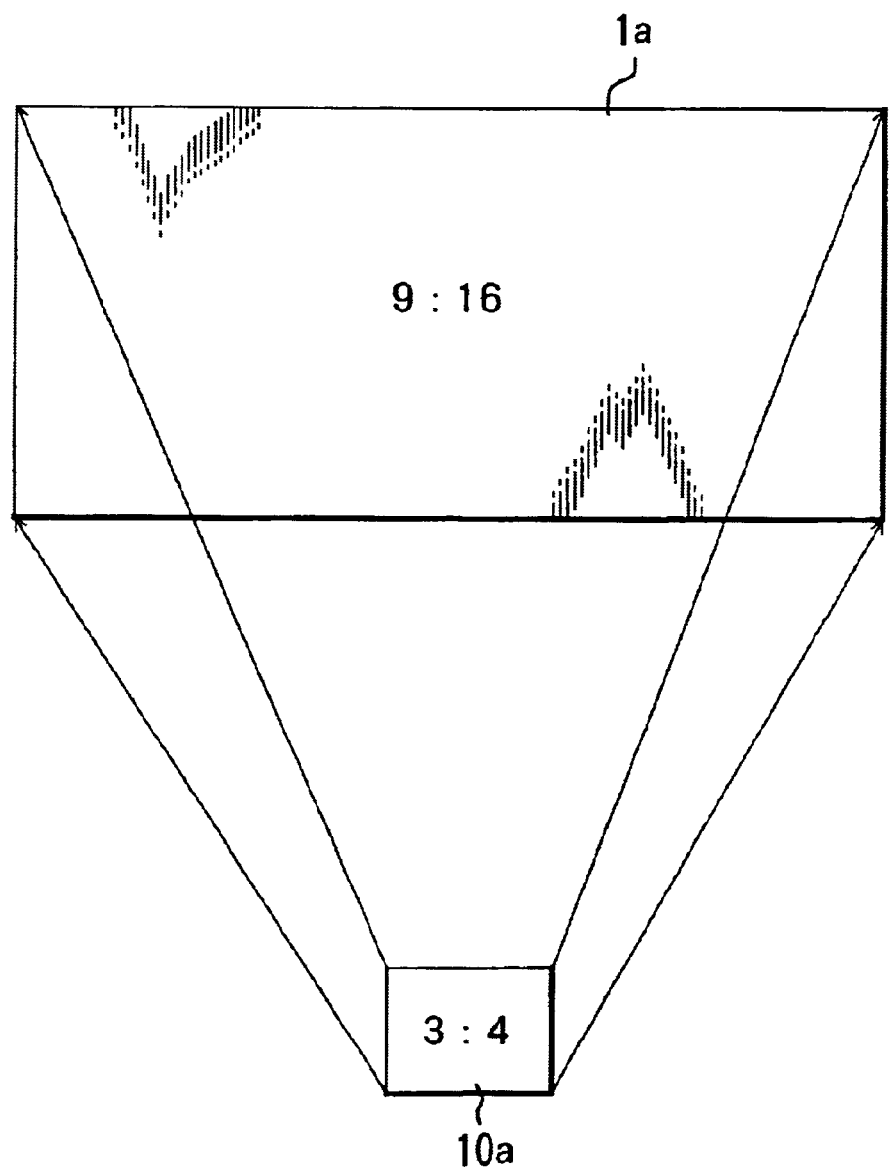
FIG. 1 is a schematic view illustrating a rear projection display apparatus of an aspect conversion type according to an embodiment of the present invention.

FIG. 1 is a view illustrating a conceptual projection with an aspect conversion rear projection display apparatus according to an embodiment of the present invention. In this embodiment, as shown in FIG. 1, an image 10a on a liquid crystal display panel (an image display device) having an aspect ratio of 3:4 is enlargedly projected onto a screen as a horizontally elongated image 1a having an aspect ratio of 9:16.

Figure 2:
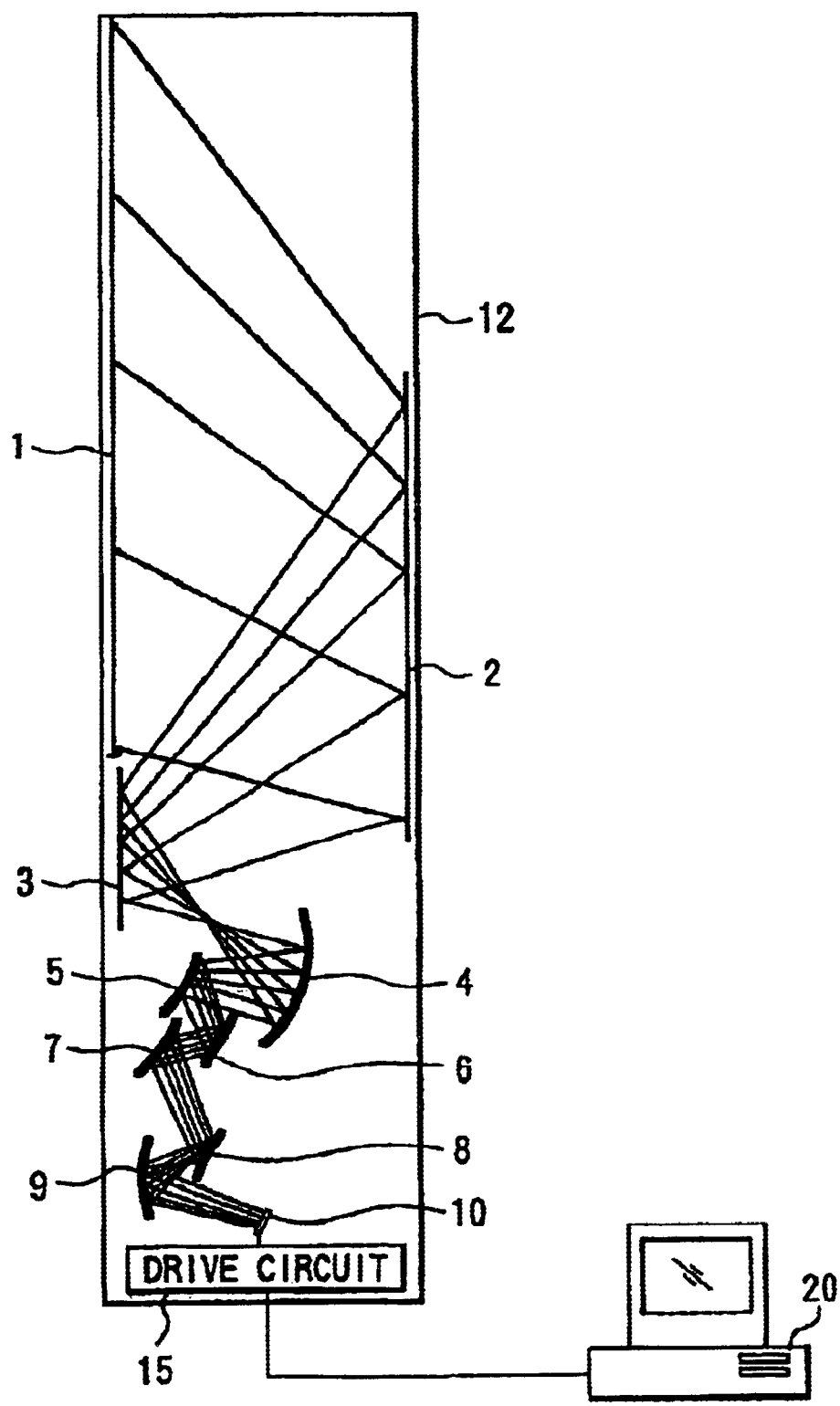
FIG. 2 is a cross-sectional view illustrating a rear projection display apparatus of the aspect conversion type.

FIG. 2 is a cross-sectional view illustrating a rear projection display apparatus according to this embodiment. In the figure, reference numeral 1 represents a screen (projection surface) for use in diagonal incidence (or a member onto which images are projected) having a diagonal size of 60 inches and an aspect ratio of 9:16, reference numerals 2,3 plane mirrors on the reflective surface of which aluminum is deposited, reference numeral 4, 5, 6, 7, 8, and 9 aspherical curved mirrors on the reflective surface of which aluminum is deposited, reference numeral 10 a liquid crystal display having an aspect ratio of 3:4, and reference numeral 12 a housing of the rear projection display apparatus.

The display apparatus is also provided with a drive circuit 15 which drives the liquid crystal display 10. Image information may be supplied from a personal computer 20 (or other apparatuses for supplying image information such as video and DVD players) to the drive circuit 15. The drive circuit 15 drives the liquid crystal display 10 in accordance with the image information to display the image.

Although no components other than described above are shown in FIG. 2, the liquid crystal display 10 is efficiently illuminated from the backside thereof with illumination light that is guided through an illumination system from a light source (not shown). The modulated and radiated light (image light) from the liquid crystal display 10 is directed to the aspherical curved mirror 9 which is located nearest to the liquid crystal display 10.

Although described later in more detail, as shown by light beams in the figure, the group of aspherical curved mirrors 4 through 9 are configured such that the image light radiated from the liquid crystal display 10 is sequentially reflected by each of the aspherical curved mirrors, i.e., from the mirror 9 to the mirror 8 to the mirror 7 to the mirror 6 to the mirror 5 in order, being finally reflected by the aspherical curved mirror 4 and thereby directed to the plane mirror 3.

The group of aspherical curved mirrors 4 through 9 is a group of mirrors having a concave surface (9), convex surface (8), concave surface (7), concave surface (6), convex surface (5), and concave surface (4) arranged in sequence from the liquid crystal display side, respectively.

Furthermore, the group of aspherical curved mirrors 4 through 9 has an image-forming action resulting from the modulation action of each mirror on the light beam reflection angle, i.e., the combination of actions by which a light beam is reflected at different angles of reflection depending on the position of incidence of the light beam (or the total action of these six mirrors). As shown in FIG. 1, according to this image-forming action, the 3:4 rectangular image 10a on the liquid crystal display 10 is aspect converted into a 9:16 image 1a having almost no distortion and thus enlargedly projected onto the screen 1, which is to be disposed diagonally with respect to the optical axis.

In the foregoing, as shown in the figure, the image light reflected by the aspherical curved mirror 4 is first reflected by the plane mirror 3 disposed below the screen 1. The reflected light is further reflected by the plane mirror 2, disposed downward opposite to the screen 1 (on the rear side of the apparatus), upward to the front. Thus, the backside of the screen 1 is illuminated with the reflected light diagonally in the upward direction. Eventually, the image light is projected diagonally onto the screen 1 in this manner.

The plane mirrors 2, 3 are each disposed substantially in parallel to the screen 1, which is vertically disposed, and in parallel to each other. This arrangement of the plane mirrors 2, 3 allows the rear projection display apparatus to be configured so as to have a thin width.

According to this embodiment, to implement a horizontally elongated 9:16 projected screen having a diagonal size of 60 inches, the rear projection display apparatus should have an overall width of 30 to 40 cm.

In this embodiment, two plane mirrors 2, 3 are employed. However, such an arrangement may be employed in which the plane mirror 3 is omitted, and the image light reflected from the aspherical curved mirror 4 is directly reflected on the single plane mirror 2 to be diagonally projected onto the screen 1.

In the foregoing, the overall configuration and projection operation of the rear projection display apparatus are described in detail. Now, with reference to FIG. 3, described below in detail is the aforementioned projection optical system having the group of aspherical curved mirrors 4 through 9 and an aperture 11.

Figure 3:
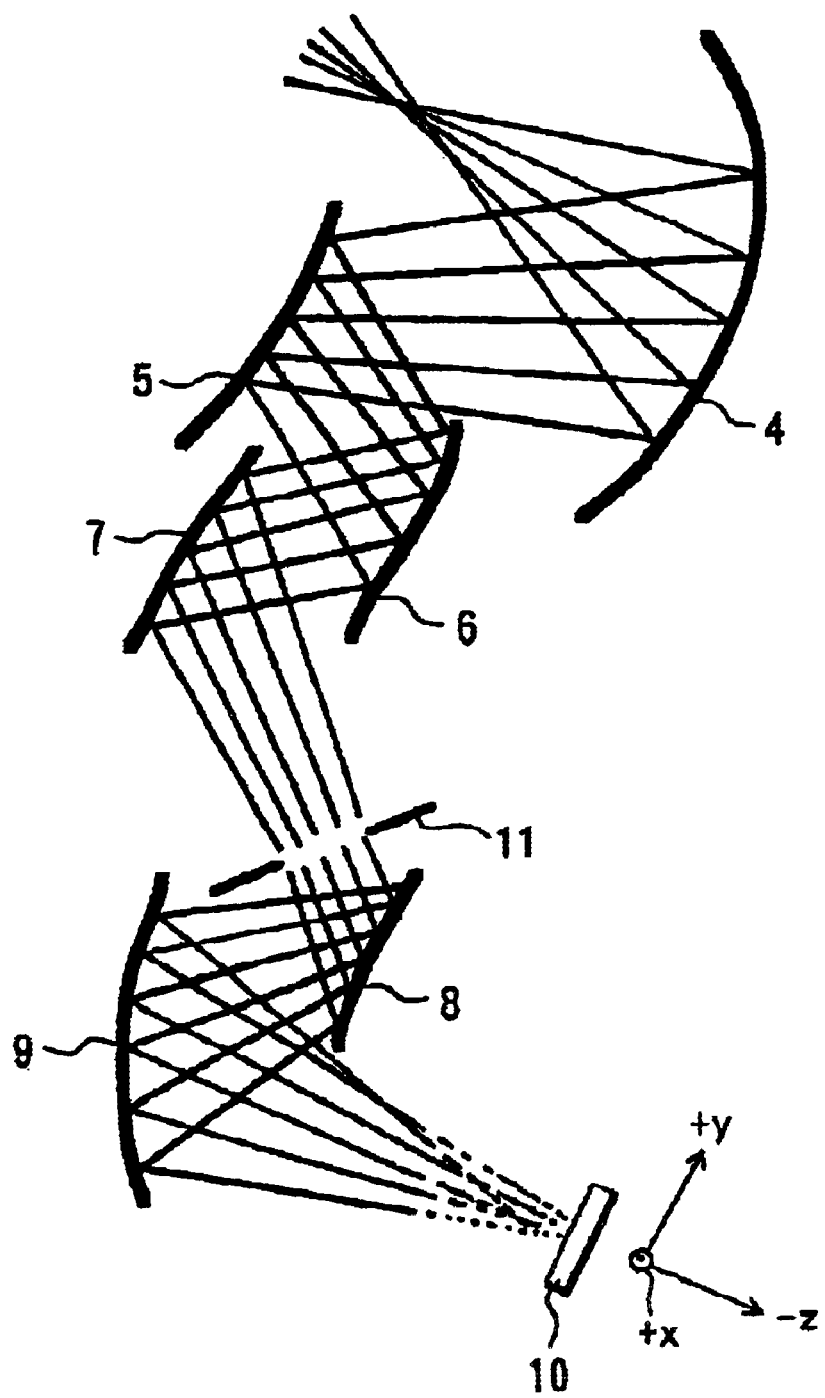
FIG. 3 is an enlarged cross-sectional view illustrating the configuration of the projection optical system in the rear projection display apparatus of the aspect conversion type shown in FIG. 2.

FIG. 3 is an enlarged cross-sectional view illustrating the projection optical system. Table 1 below shows optical data of the projection optical system (such as the spacing between respective mirror surfaces, the tilt angle of each mirror surface, and the definition of shapes of each mirror surface). The liquid crystal display device according to this embodiment has a display screen with a diagonal length of 22 mm and an aspect ratio 3:4 with its enlarged screen size on the screen 1 being 60 inches (1524 mm) in diagonal length and 9:16 in aspect ratio.

The coordinate system for defining each mirror surface employs the local coordinates of each surface. That is, the center of the liquid crystal display 10 (original image) is taken as the original point, while the normal line of the liquid crystal display 10 passing therethrough is the first optical axis that also serves as the z-axis (a local z-axis), for defining the original image surface. The direction in which light is radiated is assumed as the +(plus) direction of the local z-axis. A local y-axis, perpendicular to the local z-axis, has its +(plus) direction along the upward direction of FIG. 3. A local x-axis, perpendicular to the local y-axis and z-axis, has its +(plus) direction toward the reader of FIG. 3.

Furthermore, a point located at a distance (spacing) of d(mm) from the original point of the local coordinates of each mirror surface along the local z-axis (optical axis) is defined as the next local original point of the local coordinate for defining the next mirror surface. The direction is defined as a +(plus) titling direction in which a mirror surface having a tilt angle is tilted such that the +y-axis rotates to the +z-axis (the optical axis) side, assuming the local x-axis as a rotation axis.

The aspherical curved shape of each mirror surface is defined by the following polynomial equation of x and y.

$$z = C_4 x^2 + C_6 y^2 + C_8 x^2 y + C_{10} y^3 + C_{11} x^4 + C_{13} x^2 y^2 + C_{15} y^4 + C_{17} x^4 y + C_{19} x^2 y^3 + C_{21} y^5 + C_{22} x^6 + C_{24} x^4 y^2 + C_{26} x^2 y^4 + C_{28} y^6$$

The values of each coefficient Cn in the aforementioned equation are shown in Table 1 below as the data of each mirror surface. In the coordinates taken after light has been reflected on each mirror surface, the polarity of the z-axis of the next local coordinate system is to be inverted relative to the traveling direction of the light. Except for this, the aforementioned definition of the coordinates holds true. Therefore, in this embodiment, according to the definition of the local coordinate system, the polarity of the z-axis (optical axis) is inverted each time light is reflected while the signs of the spacing d between surfaces and those of the tilt angle are inverted each time light is reflected.

The projection optical system having the aforementioned six aspherical curved mirrors is configured so as to conform to the optical data shown in Table 1 by comprising a molded resin member which serves as a base member, and aluminum is deposited on the surface of the molded base member to form an aspherical curved reflective surface, which is retained by a die cast frame (not shown).

TABLE 1

| FNO | 3.5 (depends on the relation with an aperture size) | |
|---|---|---|
| Magnification | 56.6 (V) × 75.5 (H) | |
| Surface | d [mm] [Surface interval] | Tilt angle [°] |
| LCD surface | 120.5775 | 1.5736 |
| Surface 9 | −62.6492 | 23.8495 |
| Surface 8 | 30.7106 | −44.8190 |
| Aperture | 85.5917 | 0 |
| Surface 7 | −56.3848 | 38.1642 |
| Surface 6 | 60.0980 | −32.0571 |
| Surface 5 | −112.2501 | 30.00 |
| Surface 4 | 231.4882 | −22.7631 |
| Plane mirror 3 | −360.000 | 42.00 |
| Plane mirror 2 | 360.000 | −42.00 |
| Screen |  | 42.00 |

| Reflective surface | $C_4$ | $C_6$ | $C_8$ | $C_{10}$ |
|---|---|---|---|---|
| Surface 9 | −4.5998E−3 | −3.4279E−3 | 3.1979E−6 | −4.0332E−7 |
| Surface 8 | −5.4547E−3 | −1.7806E−3 | 7.4316E−5 | 5.9968E−6 |
| Surface 7 | 5.0617E−4 | −4.3453E−4 | 4.8010E−5 | −1.3897E−5 |
| Surface 6 | 2.0847E−3 | 1.2608E−3 | 4.2991E−5 | −1.2054E−5 |
| Surface 5 | 2.7241E−3 | 2.8291E−3 | 3.7060E−5 | 2.1242E−5 |
| Surface 4 | 4.9289E−3 | 3.6330E−3 | −2.0520E−5 | −1.6656E−5 |

| Reflective surface | $C_{11}$ | $C_{13}$ | $C_{16}$ | $C_{17}$ | $C_{19}$ |
|---|---|---|---|---|---|
| Surface 9 | −1.1445E−7 | −1.6490E−7 | −7.3997E−8 | 2.3307E−10 | −4.4810E−11 |
| Surface 8 | −5.7737E−7 | −9.6707E−7 | −2.0744E−7 | 2.1289E−8 | 1.1905E−8 |
| Surface 7 | 5.1751E−7 | −1.5477E−7 | 7.9950E−8 | 7.1457E−9 | 5.0323E−9 |
| Surface 6 | 2.2046E−7 | −8.9517E−8 | 9.2527E−8 | 1.3134E−10 | 3.3623E−9 |
| Surface 5 | 7.8372E−8 | 5.0252E−7 | 7.8472E−7 | 9.9604E−9 | 2.5784E−8 |
| Surface 4 | 3.4637E−8 | 1.9906E−7 | 2.0571E−7 | −9.8046E−11 | −9.9966E−10 |

| Reflective surface | $C_{21}$ | $C_{22}$ | $C_{24}$ | $C_{26}$ | $C_{28}$ |
|---|---|---|---|---|---|
| Surface 9 | −1.5704E−10 | −7.7745E−12 | −1.2633E−11 | −1.0976E−11 | −3.9762E−12 |
| Surface 8 | 1.5133E−9 | −1.4750E−10 | −2.7747E−10 | −2.1048E−11 | −1.8803E−11 |
| Surface 7 | 7.6126E−10 | 3.4412E−11 | 6.2269E−11 | 3.6611E−11 | −9.1842E−12 |

TABLE 1-continued

| Surface 6 | 1.9642E−9 | 2.8117E−12 | −2.3186E−11 | −1.6571E−11 | −5.2030E−12 |
|---|---|---|---|---|---|
| Surface 5 | 1.8083E−8 | 1.1415E−10 | 4.6894E−11 | 4.2318E−10 | −1.3716E−10 |
| Surface 4 | −1.9185E−9 | 1.5526E−12 | 4.0091E−12 | 7.0632E−12 | 1.0912E−1 |

The optical specifications obtained by the projection optical system provide a satisfactory image-forming performance as shown below regardless of the severe diagonal angle of incidence of 42 degrees on the screen 1.

Figure 4:
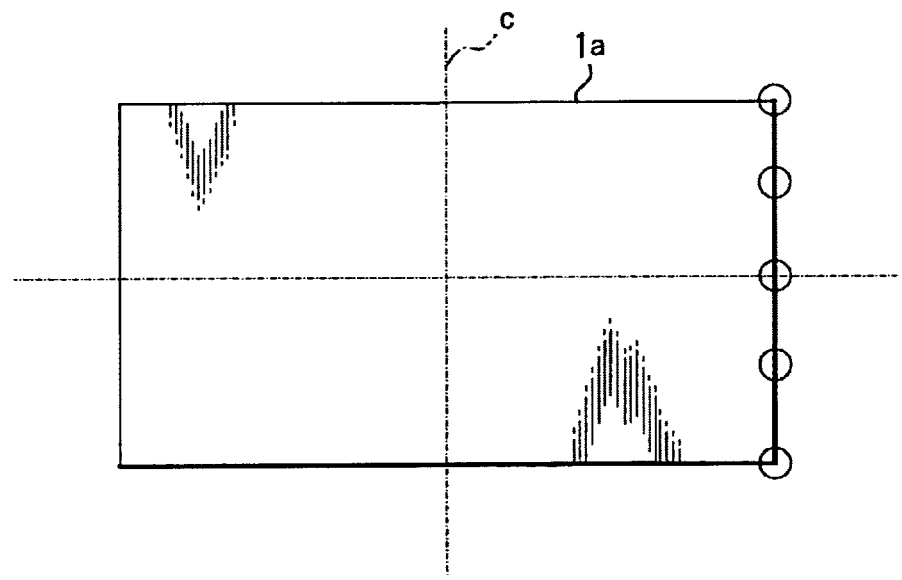
FIG. 4 is an explanatory view illustrating MTF display points according to the projection optical system shown in FIG. 3.
Figure 5:
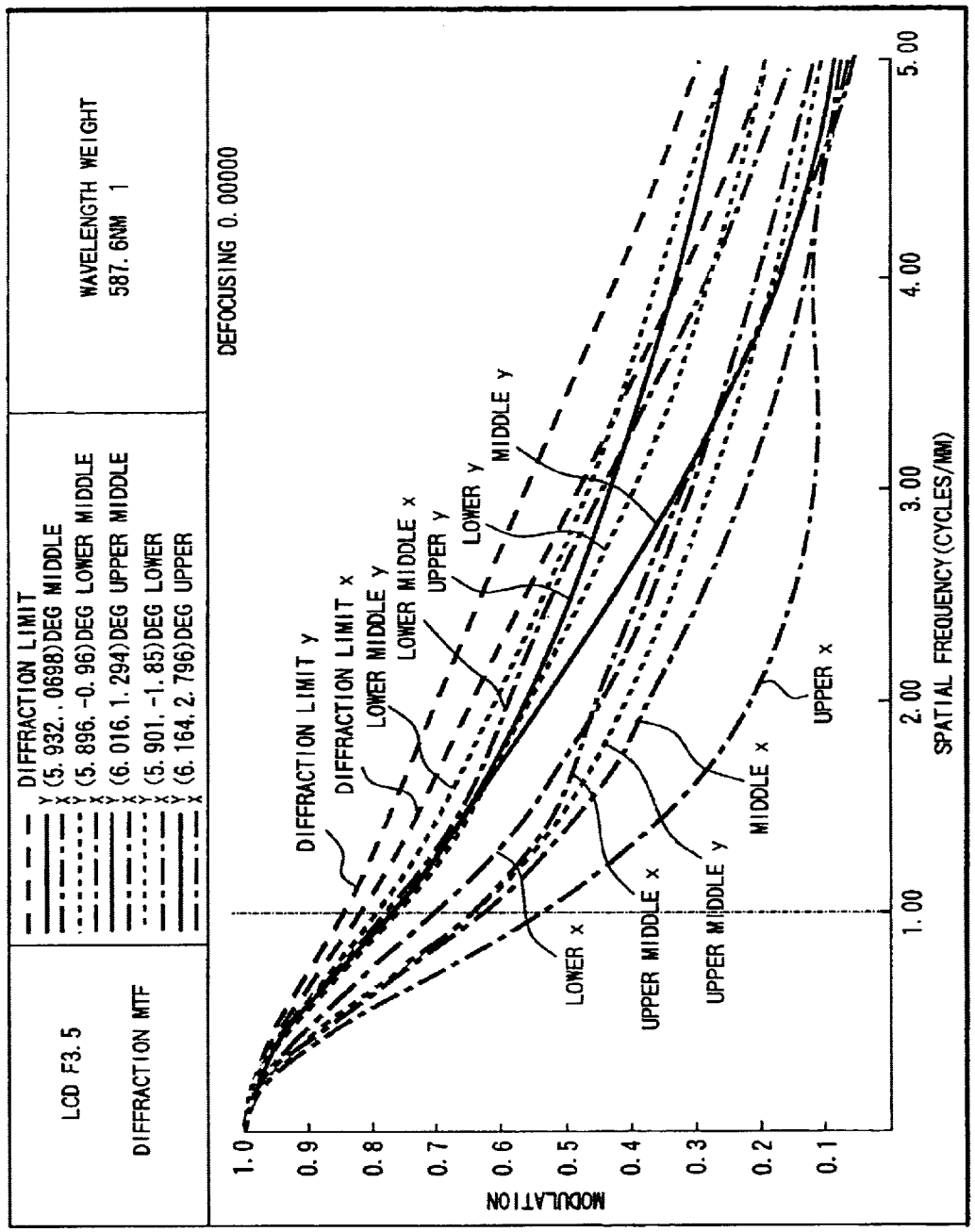
FIG. 5 is a view illustrating a MTF property according to the projection optical system shown in FIG. 3.

First, the F-number of the projection optical system is 3.5. Furthermore, FIG. 5 shows the MTFs, measured in the X-direction and Y-direction, which have been obtained at a total of five points (upper, upper middle, middle, lower middle, and lower points), each circled on the left edge or right edge of the rectangular projected area 1a shown in FIG. 4. In this arrangement, since the configuration of the projection optical system and its aberration are symmetrical with respect to its centerline C, only the MTFs of the right-hand side were measured. As can be seen from the results, MTFs of 50% or more were obtained at 1 cycle (1 line & 1 space)/mm (on a 60-inch projected image).

Figure 6:
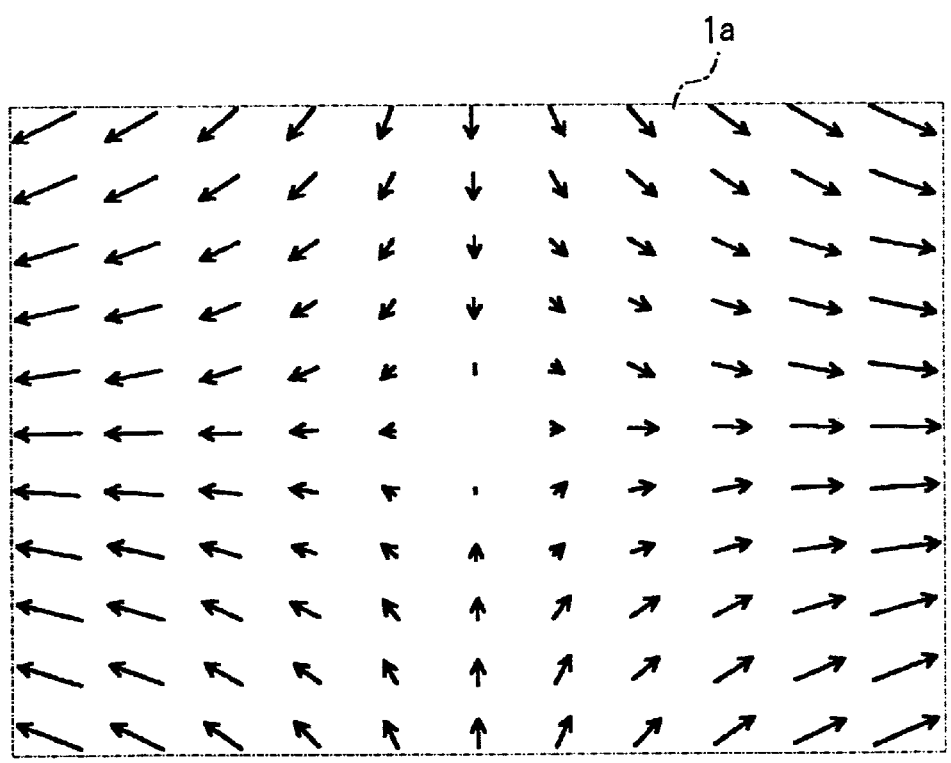
FIG. 6 is a view illustrating the distortion of an image projected by the projection optical system shown in FIG. 3.

On the other hand, exaggerated distortion patterns in the projected area 1a are shown in FIG. 6. The orientation of the arrows shows the direction of the distortion and the length thereof shows the amount of distortion. A high distortion is found at the four corners of the projected area 1a. However, distortions were 2% or less in an amount even at the four corners where relatively high distortion was found.

Figure 7:
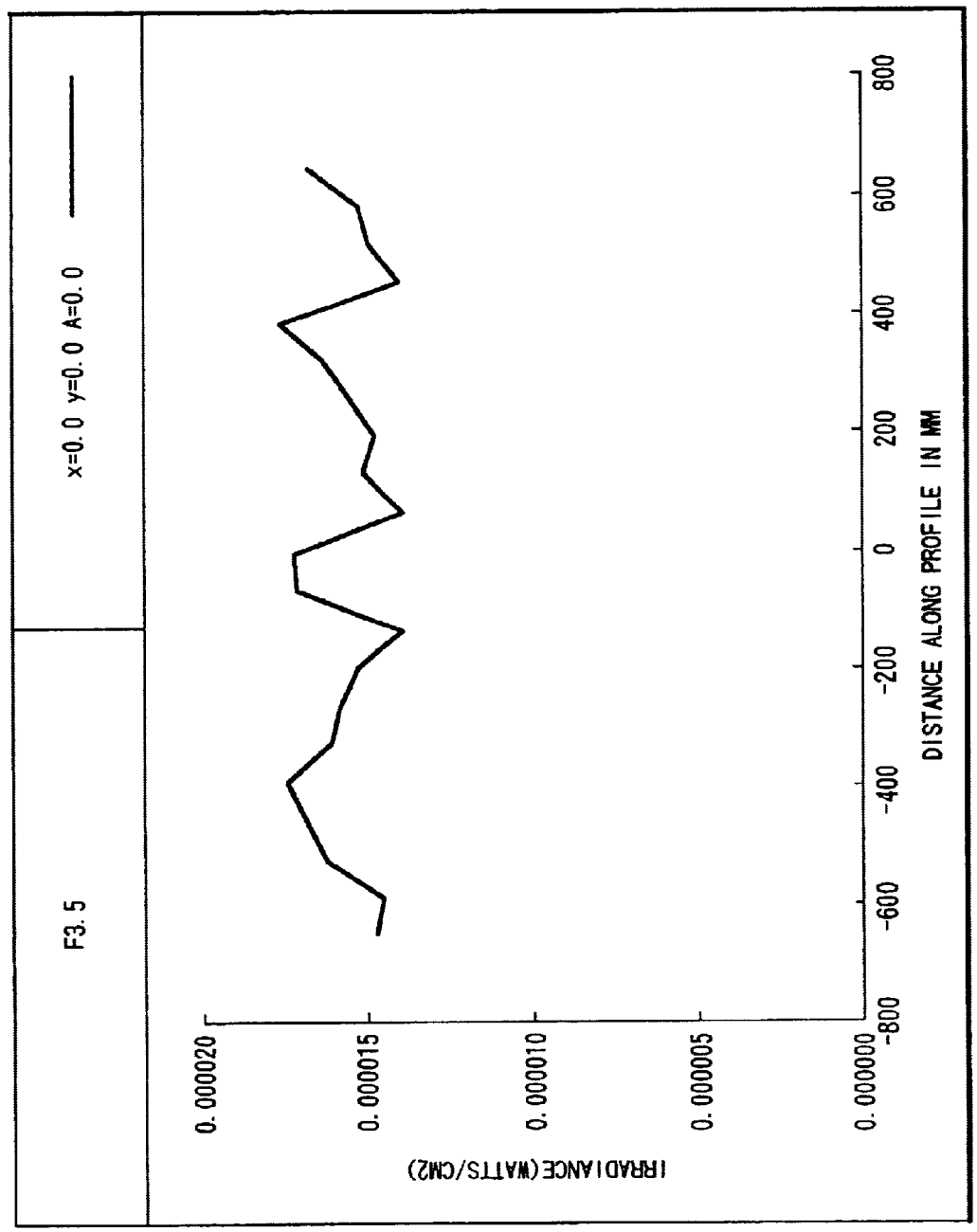
FIG. 7 is a view illustrating the brightness distribution of an image projected by the projection optical system shown in FIG. 3.

For unevenness in brightness, FIG. 7 shows the distribution of brightness on the horizontal cross section passing through the projected image. Although the distribution of brightness is shown a slightly discontinuous image due to the lack of light beams in number in the optical simulation, the figure shows a satisfactory distribution where less drops in brightness are found on the periphery.

As described above, this embodiment provides an angle of capturing sufficient light fluxes (with an F-number of 3.5) and a satisfactory image-forming performance, thus providing such a level that can even be applied to a high-resolution and high-quality image projection of the so-called high-vision level.

The condition shown by the following equation must be satisfied to convert the aspect ratio from 3:4 to 9:16 or inversely or perform an aspect conversion of an equivalent or higher degree of ratio (e.g., from an aspect ratio of 1:1 to 3:4 or from an aspect ratio of 1:1 to 9:16).

$$fx/fy < 9/10 \times \cos\theta \text{ or } fx/fy > 10/9 \times \cos\theta,$$

where fx is the focal length of the paraxial in the x-direction, fy is the focal length of the paraxial in the y-direction, in a case where the principal point is at the position of the opening (aperture), and θ is the angle of incidence of the optical axis diagonally incident onto the projection surface (screen).

In this embodiment, the fx and fy, each being a focal length of the paraxial, can be calculated from a second order coefficient $C_4$ of x and from a second order coefficient $C_6$ of y, respectively, so that fx=16.4 mm, fy=29.3 mm, cosθ=cos42°, which is approximately equal to 0.74. Substituting these values for the foregoing equation gives $$fx/fy \approx 0.56 < 0.9 \times 0.74 = 0.666,$$

from which it can be seen that the aforementioned equation is satisfied.

On the other hand, this embodiment employs the screen 1 for diagonal incidence. The screen 1 comprises three pieces of members, arranged in sequence from the side of incidence; a first eccentric Fresnel lens, a second eccentric Fresnel lens, and a lenticular lens, all of which are stacked upon each other.

In the foregoing arrangement, the two eccentric Fresnel lenses have completely the same specifications (in terms of the optical structure). This is because prism processing only by one piece of eccentric Fresnel lens cannot be successfully finished so as to meet the severe diagonal incidence as in this embodiment.

This eccentric Fresnel lens can be formed by cutting out of an ordinary concentric Fresnel lens at its position spaced apart by a predetermined distance from the center of the concentric Fresnel lens.

The projection optical system of this embodiment has the six aspherical curved mirrors 4 through 9. And two surfaces of which are convex surfaces and four surfaces of which are concave surfaces among the six aspherical curved mirror 4 through 9. However, the projection optical system of the present invention is not limited to this arrangement, and thus the number of concave and convex surfaces can be changed. However, for six aspherical curved mirrors, it is preferable to provide two or more concave and convex surfaces each in order to preventcurvature of field.

As described above, this embodiment provides the aforementioned satisfactory image-forming performance regardless of the aspect conversion and diagonal projection. However, in a case where number of the aspherical curved mirror is being reduced to four to five surfaces, it is conceivable that some problems would occur in the optical performance such as reduction of MTF or occurrence of distortion. This is presumably because such an attempt as to obtain a desired optical performance under a severe condition of diagonal incidence will require the corresponding absolute number of variable parameters.

The configuration of this embodiment described above is only an example, and may be arranged in a variety of ways. For example, this embodiment has employed the six aspherical curved mirrors as the projection optical system but seven or more mirrors may also be used. In addition, the liquid crystal display device has been used as the image display device, however, the present invention is not limited thereto. It is also possible to configure a thin aspect conversion type rear projection display apparatus using a reflective type display device such as digital micro-mirror devices (DMDs) or organic EL (electro-luminescence) display devices.

Furthermore, as for the screen configuration, it is also possible to use a diffused plate instead of the lenticular lens, and a linear Fresnel lens or a hologram plate or a hologram sheet instead of the eccentric Fresnel lens.

As described above, according to this embodiment, even in a projection optical system having a wide angle of view and a short distance of projection, it is possible to implement a projection optical system that is capable of suppressing distortion and performing an optical aspect conversion, an image display apparatus, such as a rear projection display apparatus, which employs this projection optical system, and an image display system further adding an image information display apparatus.

In this embodiment, such a projection optical system has been described which performs an aspect ratio conversion on an original image of 3:4 to a projected image of 9:16. However, the present invention is not limited thereto but may also be applied to a projection optical system that performs an aspect ratio conversion other than this.

With an aspect ratio defined by dividing the vertical length of an image by its horizontal width, the projection optical system preferably projects an original image in a manner such that the aspect ratio of an image projected onto a projection surface (such as a screen) is 1.3 times or greater or 0.8 times or less than that of the original image.

While preferred embodiments have been described, it is to be understood that modification and variation of the present invention may be made without departing from the sprit or scope of the following claims.

What is claimed is:

1. A projection optical system which projects an original image onto a projection surface, comprising:
    at least six aspherical curved mirrors, each having an aspherical surface, said at least six aspherical curved mirrors reflecting image light from the original image in sequence and then forming the image on the projection surface,
    wherein said projection optical system forms a projected image on the projection surface at an aspect ratio different from that of the original image by a combination of reflective actions of the image light on the aspherical surfaces of said at least six aspherical curved mirrors.

2. The projection optical system according to claim 1, comprising: of the six aspherical curved mirrors, at least two aspherical curved mirrors having a positive refractive power together with two aspherical curved mirrors having a negative refractive power.

3. The projection optical system according to claim 1, wherein, among said at least six aspherical curved minors, both the mirror closest to the original image and the mirror closest to the projection surface are concave.

4. The projection optical system according to claim 1, comprising: a concave, convex, concave, concave, convex, and concave aspherical curved mirror arranged in sequence from the original image side.

5. The projection optical system according to claim 1, comprising: at least one plane mirror, which reflects image light transmitted from said at least six aspherical curved mirrors.

6. The projection optical system according to claim 5, wherein said at least one plane mirror is disposed substantially in parallel to the projection surface.

7. The projection optical system according to claim 1, comprising: a concave aspherical curved mirror, a convex aspherical curved mirror, a concave aspherical curved mirror, a concave aspherical curved mirror, a convex aspherical curved mirror, and a concave aspherical curved mirror arranged in sequence from the original image, and two plane mirrors.

8. The projection optical system according to claim 1, wherein an aspect ratio defined by dividing the vertical length of an image by its horizontal width, an aspect ratio of an image projected onto said projection surface is 1.3 times or greater than the aspect ratio of said original image or 0.8 times or less than the aspect ratio of said original image.

9. An image display apparatus, comprising: an image display device, which displays an original image, and a projection optical system according to claim 1, which projects image light radiated from said image display device, illuminated with said light source onto a projection surface.

10. The image display apparatus according to claim 9, wherein said projection optical system projects image light radiated from said image display device onto the projection surface in a diagonal direction.

11. The image display apparatus according to claim 9, wherein said projection optical system projects image light radiated from said image display device onto backside surface of the projection surface.

12. An image display system comprising: an image display apparatus according to claim 9, and a projected member configuring the projection surface, wherein the projected member has at least two eccentric Fresnel lenses stacked, said eccentric Fresnel lenses having an identical construction.

13. An image display system according to claim 12, wherein in said projected member, said two eccentric Fresnel lenses having an identical construction are disposed in a stacked state, and one lenticular lens is disposed.

14. An image display system comprising: an image display apparatus according to claim 9, and an image supply apparatus, which supplies image information to be displayed on said image display device to the image display apparatus.

15. A projection optical system which projects an original image onto a projection surface, comprising:
    a plurality of aspherical curved mirrors, each having an aspherical surface, said plurality of aspherical curved mirrors reflecting image light from the original image in sequence and then forming the image on the projection surface,
    wherein said projection optical system forms a projected image on the projection surface at an aspect ratio different from that of the original image by a combination of reflective actions of the image light on the aspherical surface of said plurality of aspherical curved mirrors, and
    each of said aspherical curved mirrors is shaped so as to provide a distortion of 2% or less for the projected image.

16. An image display apparatus, comprising: an image display device, which displays an original image, and a projection optical system according to claim 15, which projects image light radiated from said image display device, illuminated with a light source onto a projection surface.

17. An image display apparatus comprising:
    an image forming device which forms an original image with a first aspect ratio; and
    a projection optical system which forms a real image by using image light from the image forming device illuminated with light from a light source onto a projection surface, the real image having a second aspect ratio and the projection optical system including a flat mirror and a plurality of curved mirrors, each of the curved mirrors having an aspherical shape,
    wherein the first aspect ratio and the second aspect ratio are different from each other.

18. An image display apparatus according to claim 17 wherein the projection optical system includes two plane mirrors.

19. An image display apparatus according to claim 17, the image display apparatus further comprises a projected member with the projection surface.

20. An image display apparatus according to claim 19, wherein the projected member is a lenticular lens.

21. An image display apparatus according to claim 19, wherein the projected member is a eccentric Fresnel lens.

22. An image display apparatus according to claim 19, wherein the projected member includes a diffused plane.

23. An image display apparatus according to claim 19, wherein the projection optical system projects the image light onto backside surface of the projection member.

* * * * *